United States Patent [19]
Cayan

[11] Patent Number: 5,325,563
[45] Date of Patent: Jul. 5, 1994

[54] WINDSHIELD WIPER ASSEMBLY WITH TILTABLE BLADE

[76] Inventor: Lai W. Cayan, No. 17, Na Chang Chou, Soun Hsie Hsan, Taipei, Taiwan

[21] Appl. No.: 94,808

[22] Filed: Jul. 20, 1993

[51] Int. Cl.⁵ .......................... B60S 1/38; B60S 1/40
[52] U.S. Cl. .............................. 15/250.33; 15/250.42; 15/250.31
[58] Field of Search ........... 15/250.33, 250.42, 250.31, 15/250.22, 250.32

[56] References Cited

U.S. PATENT DOCUMENTS

| | | | |
|---|---|---|---|
| 2,915,769 | 12/1959 | Ryck | 15/250.33 |
| 4,169,298 | 10/1979 | Smith | 15/250.33 |
| 4,287,634 | 9/1981 | Speth | 15/250.33 |

FOREIGN PATENT DOCUMENTS 2398645  3/1979  France .................. 15/250.33

Primary Examiner—Philip R. Coe
Assistant Examiner—Gary K. Graham

[57] ABSTRACT

An improved wiper blade assembly is provided which has an arm member with links and blade holders pivotally and rotationally connected thereto. The links and blade holders supporting a blade member for wiping over a windshield surface. A positioning device is provided between the link and the arm to enable adjusting of the relative rotation between the link and arm. When the wiper assembly swings over the windshield, the contact angle of the blade is changeable to protect the windshield and extend the life of the wiper blade.

2 Claims, 7 Drawing Sheets

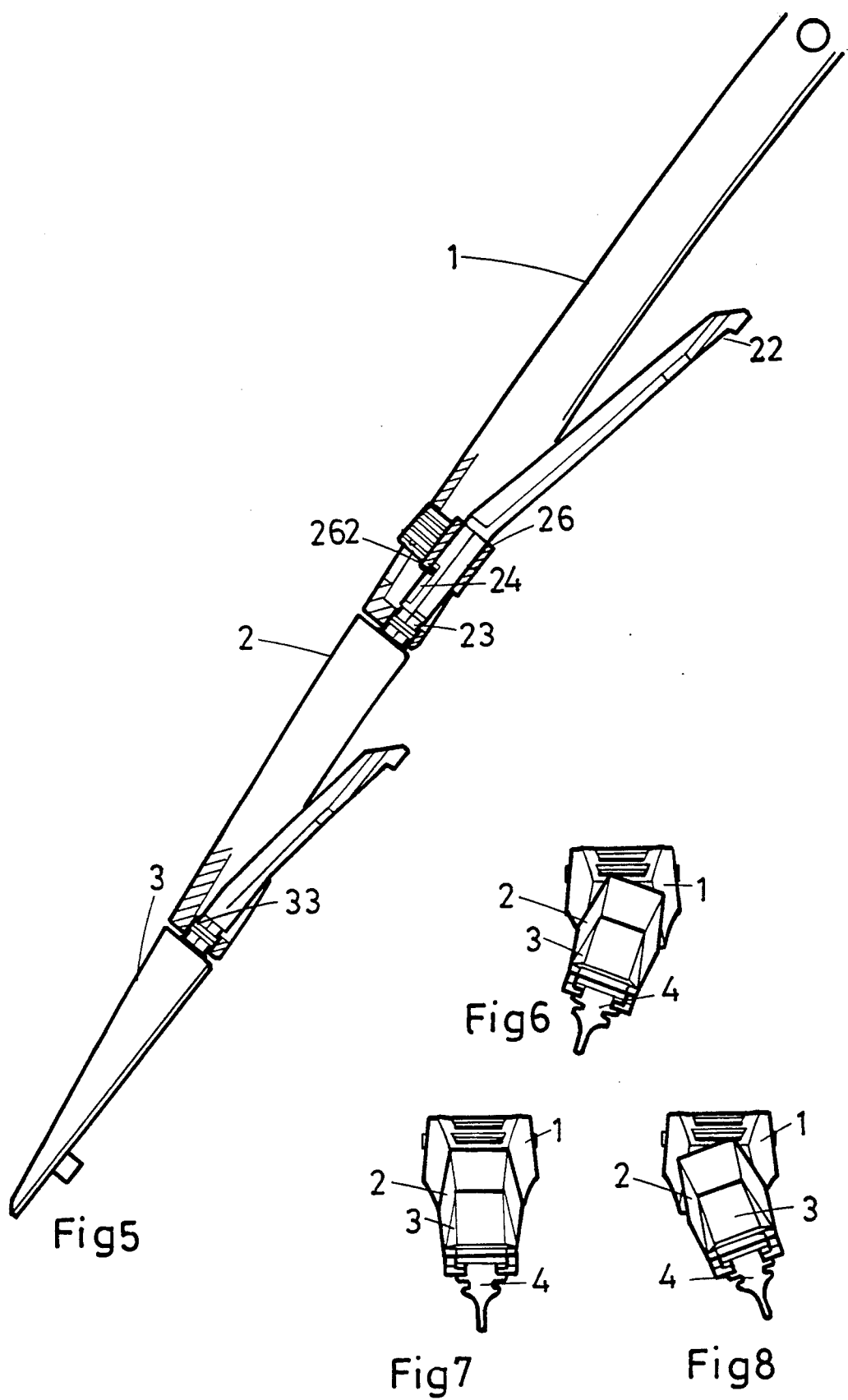

WINDSHIELD WIPER ASSEMBLY WITH TILTABLE BLADE

BACKGROUND OF THE INVENTION

The present invention relates to an improvement of the structure of windshield wipers, and more particularly to a wiper arm link which slants automatically while the wiper is swinging. The present invention protects the windshield and extends the life of the wiper blade.

The prior art wiper comprises one arm, tow links, two blade holders and a blade. Said links are connected to the front end and rear end of the arm, and blade holders are connected to said links by inserting projections on said links into the holes on said blade holders. Blades are installed in the blade holders so as to form a complete wiper. However, such Joint structure allows the prior art wiper to move only up-and-down (cannot swing right-and-left or stretch back and forth) at the connecting points between the wiper link and the blade holder. Said structure has the following drawbacks:

1. The wiper cannot slant appropriately.
2. The rubber wiper blade, which bears most of the applied force, can be damaged easily.
3. The interaction between the wiper and dust can scratch the windshield.
4. The wiper cannot be adjusted appropriately to different windshields.
5. While the wiper is swinging, the fixed fulcrums cannot be adjusted automatically and appropriately.

SUMMARY OF THE INVENTION

The present invention relates to an improved structure of windshield wiper and more particularly to a wiper link which slants automatically while the wiper is swinging.

The present invention eliminates the drawbacks of the prior art wipers. It is therefore an object of the present invention to provide a wiper which will not be damaged by the resistance of its own weight. It is another object of the present invention to protect the windshield from movement of the wiper which could scratch the surface of the windshield. The present invention eliminates resistance between the windshield and the wiper while the wiper is swinging.

BRIEF DESCRIPTION OF THE DRAWINGS

FIG. 5 is a sectional view of the present invention;

FIG. 6 is an illustration of the present invention in rotary angle No. 1;

FIG. 7 is an illustration of the present invention in rotary angle No. 2;

FIG. 8 is an illustration of the present invention in rotary angle No. 3;

DETAILED DESCRIPTION OF THE PREFERRED EMBODIMENTS

Figure 1:
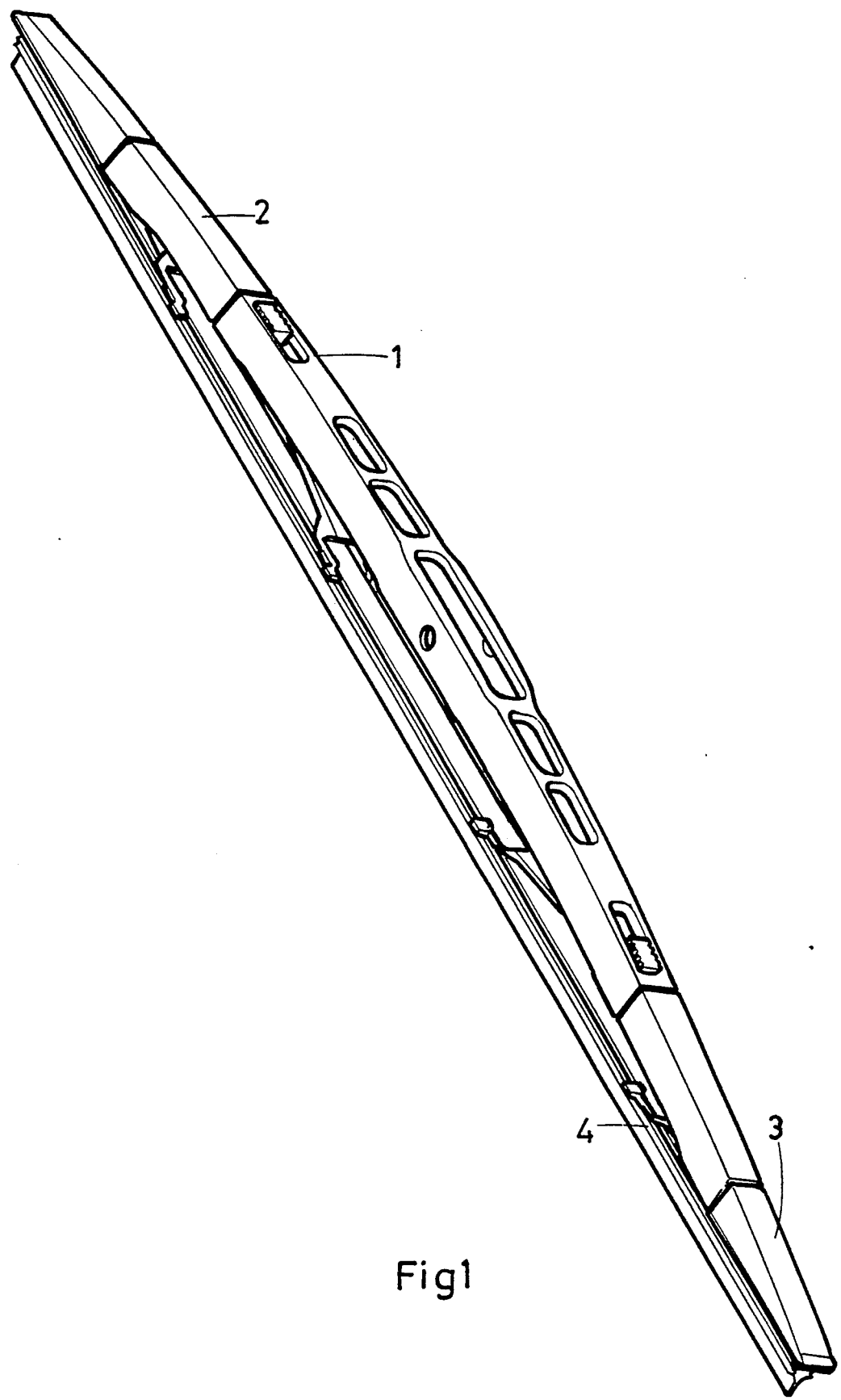
FIG. 1 is a perspective view of the external features of the present invention.
Figure 2:
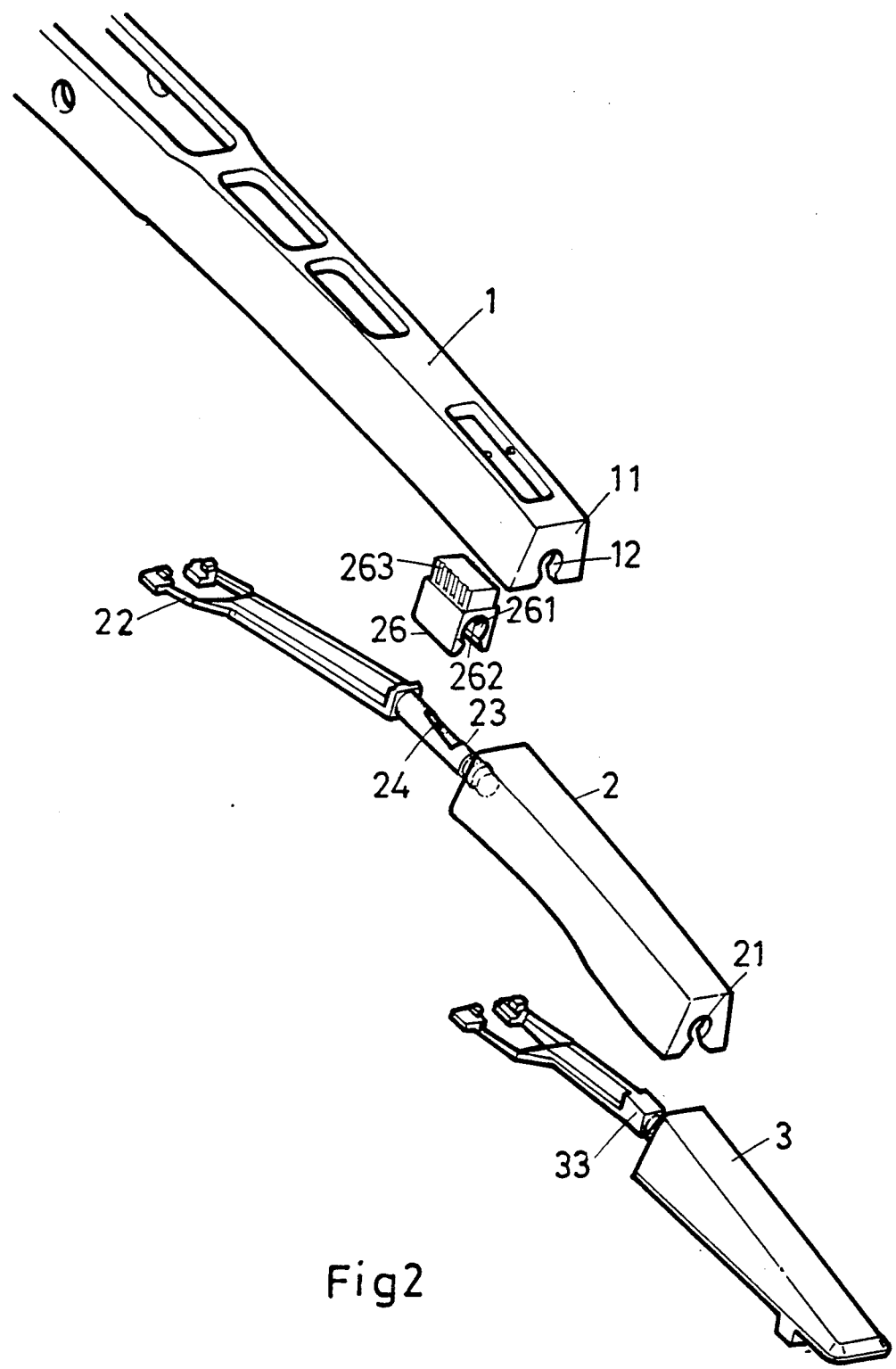
FIG. 2 is an exploded view of the present invention.
Figure 3:
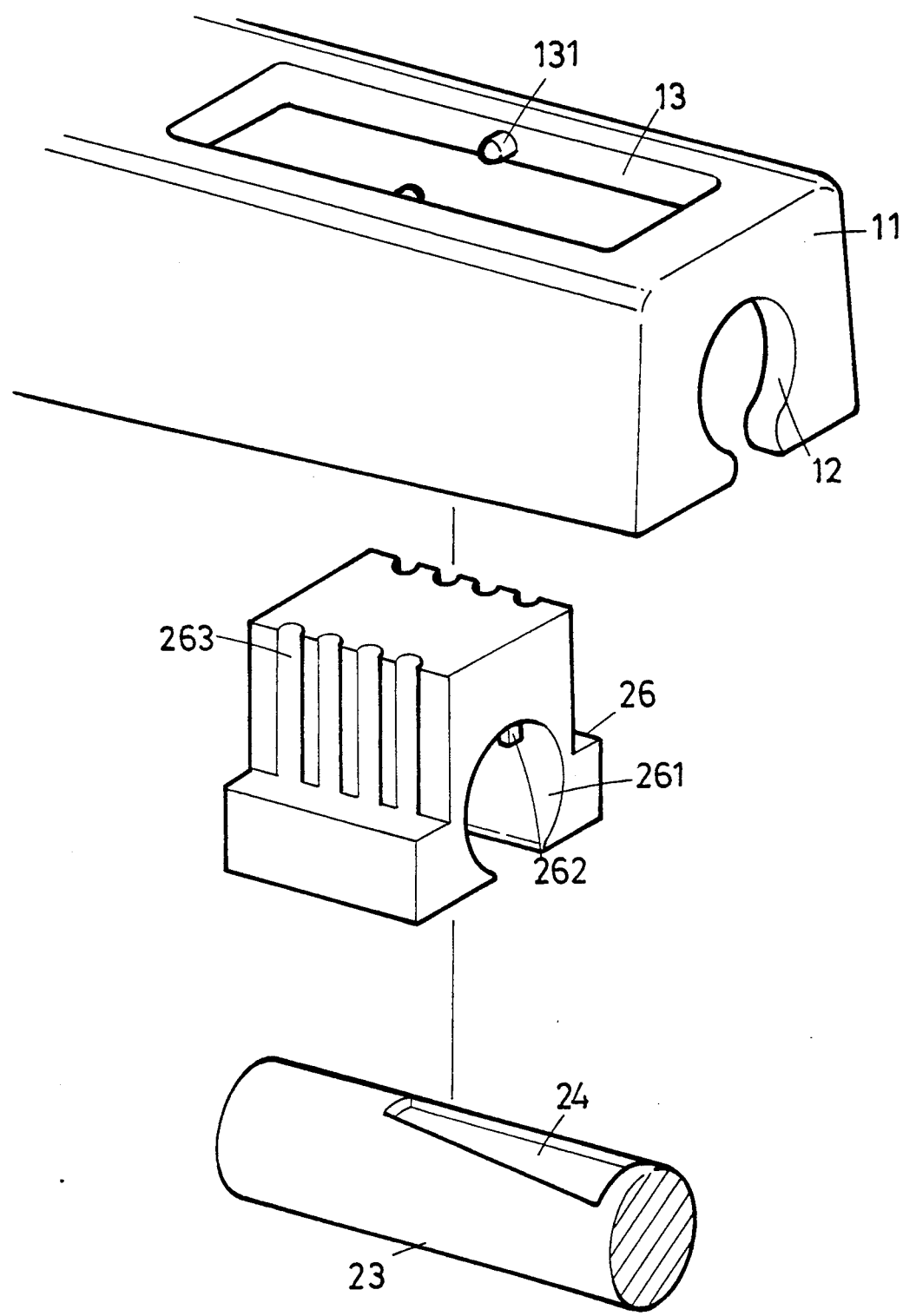
FIG. 3 is a detail view of the positioning device, adjusting hole and the trapezoid indentation of the present invention.

Referring to FIGS. 1 through 3 therein illustrated is an improved wiper. The front end of arm 1 connects to the rear end of wiper link 2. The front end of wiper link 2 connects to the rear end of blade holder 3. A wiper blade 4 is fixed by the bottom clamping part of the link 2 and blade holder 3.

Said arm 1 has adjusting holes 13 installed in the front and rear ends wherein symmetrical projections 131 are mounted inside the hole and a downward connecting hole 12 installed in the connecting end 11 which connects with the link 2.

A mortise 21, which connects to the blade holder 3, is in the front end of the link 2, to whose rear end is attached by the clamp coupling 22 of blade 4. The middle part of said link is the cylinder 23 which connects to am 1. There are concave trapezoid depressions 24 on the surface of the rear section of cylinder 23. The depression 24 corresponds to projecting tab 262 of the positioning device 26.

The positioning device 26, a rectangular case whose width fits the inner diameter of the arm 1, has pairs of symmetrical channels 263, and includes a downward facing round connecting slot 261. The projecting tab 262, which is in the center of the top of the connecting slot 261, fits into the trapezoid depression 24 of the link 2.

Figure 4:
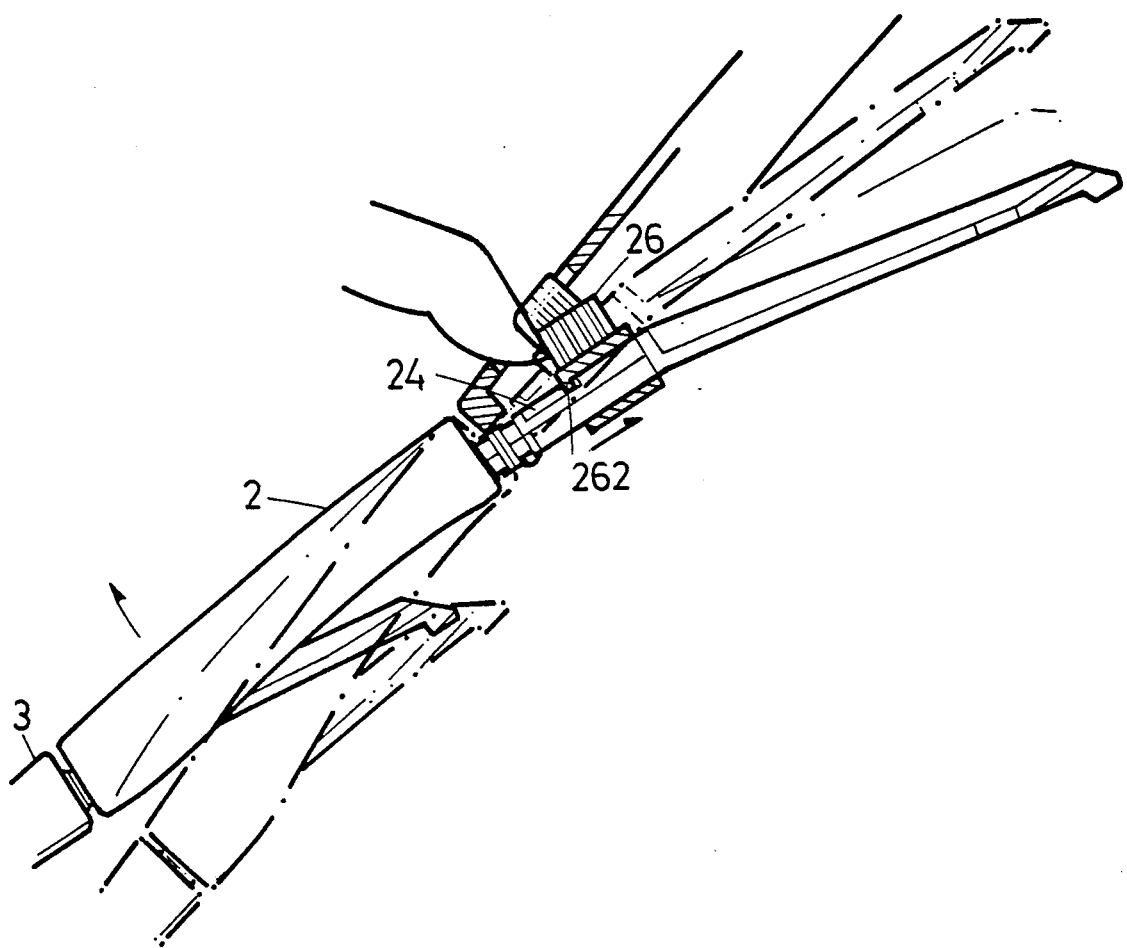
FIG. 4 is an schematic drawing of the adjustment of swing of the present invention.

Referring to FIGS. 3, 4 and 5, therein illustrated is the assembly process of the parts. Firstly, place the positioning device 26 onto the cylinder 23 of the link 2 so as to insert said projecting tab 262 into said trapezoidal depression 24. Mortise said link 2 to am 1 via the round connecting opening 12. Then select a pair of channels 263 of positioning device 26 to connect to arm 1. When the arm 1 is lowered onto the positioning device 26, the projections 131 in the adjusting hole 13 will slide into the selected pair of channels 263. Finally, assemble said blade holder 3 and said blade 4 in order.

Choosing different pairs of channels 263 to fit onto the projections 131 inside the adjusting hole 13 allows the projecting tab 262 to move between the thin part and the wide part of said trapezoid depression 24 for slanting said am 1. The adjustment can be performed by raising the front end of said link 2 and moving the positioning device 26 inside the adjusting hole 13 by a finger or a screwdriver.

Referring to FIGS. 6, 7 and 8. When the complete wiper moves, the mortise of said link 2 and said am 1, and the rectangular case of said positioning device 26 allows said link to be parallel to said am 1, to slant to a certain angle, or to swing up and down freely.

Figure 9:
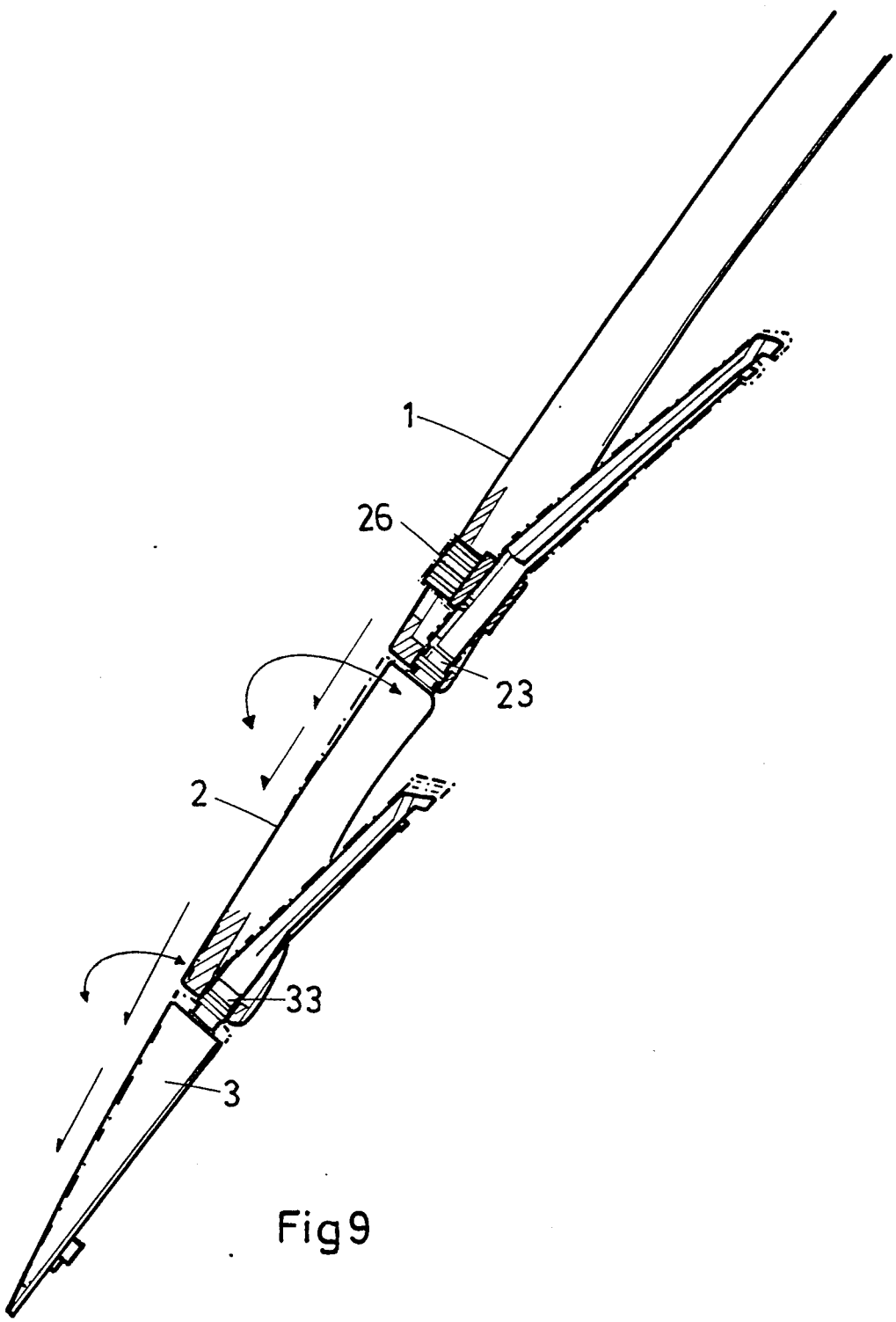
FIG. 9 is a perspective of the present invention showing direction of motion.
Figure 10:
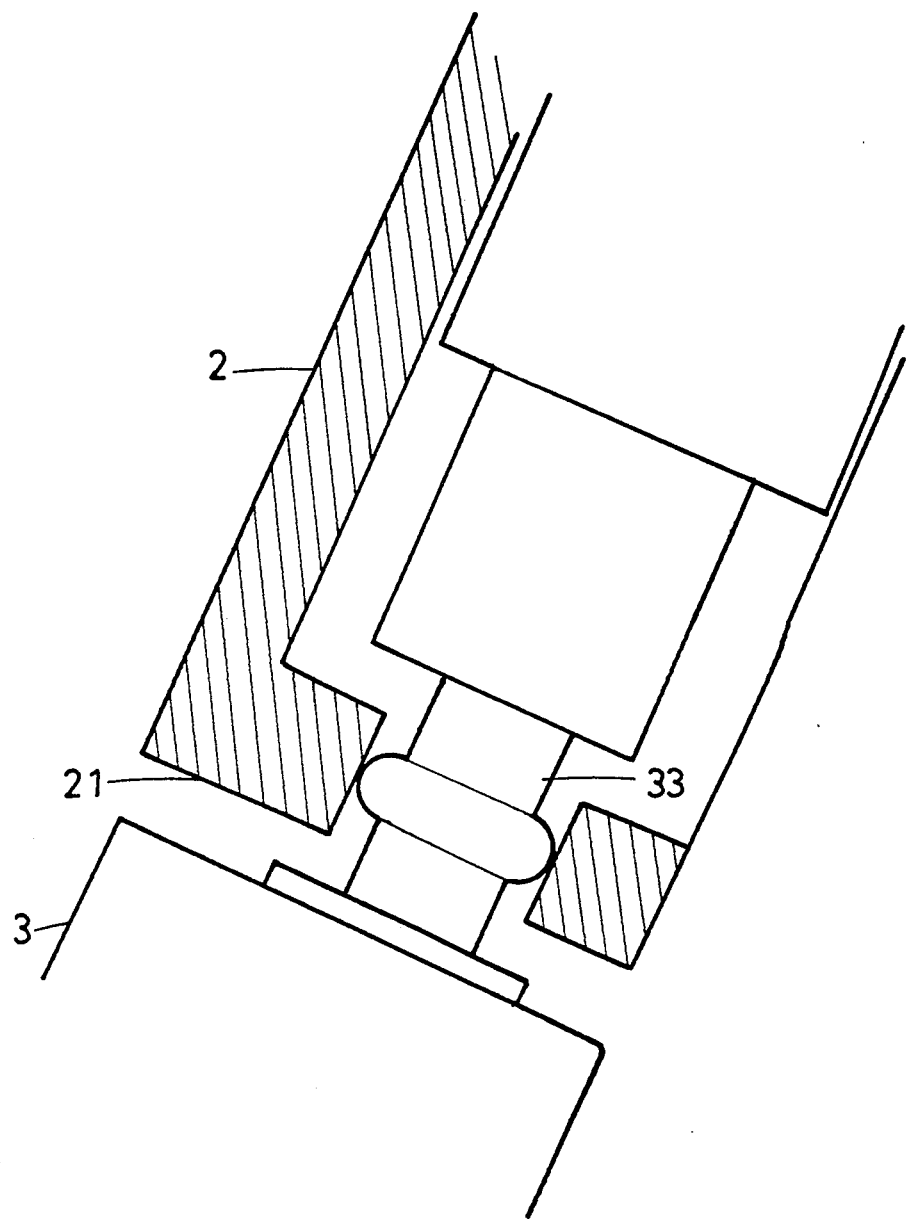
FIG. 10 is a sectional view illustration of the connection between arms and links.

Referring to FIG. 9, therein illustrated is the connecting relation between said am 1, said link 2 and said blade holder 3 as shown in FIGS. 1, 3 and 10. The middle part of the blade holder 2 is a connecting element 33, whose rear is connected to a rectangular case. The width of said connecting element should fit the bottom of said link 2 so as to help the blade holder 3 remain parallel to the link 2 and move up and down when the wiper is swinging. The connecting point of the link 2 within the positioning device 26 may be changed by sliding the cylinder 23 within the connecting hole 12. Likewise, the connecting element 33 may be moved within the mortise 21. This allows the effective length of the assembly to be extended, thus diverting the applied force to different fulcrums.

According to the preceding description, we can see the following advantages of the present invention;

1. When the wiper is swinging, said link 2 and said blade 4 will slant to an angle so as to release some resistance and eliminate the abrasion on the blade.

2. The life of the rubber blade can-be extended by adjusting the rotary angle of the wiper.

3. The change of said projecting tab's position in said trapezoidal depression 24 would reduce the swing when the wiper stretches out but restore the swing when the wiper stretches back automatically. The force said wiper bears would be evenly distributed.

4. The slanting angle of the wiper is controllable so as to adapt to the changing weather.

The present invention relates to a functional, practical and improved wiper which is easy to assemble and manufacture. The structure of the wiper is very simple and the manufacturing cost will not be increased. While only a few embodiments of the present invention have been shown and described, it will be seen that various modifications can be made without departing from the spirit and scope of the invention.

What is claimed is:

1. A windshield wiper assembly comprising:

an elongated arm having two opposite ends, two elongated links, two elongated blade holders, and an elongated blade;

said arm having an adjusting hole at each end, said arm having a pair of axially aligned projections extending therefrom into each hole bore and said arm having a downward facing round connecting opening;

each link having a mortise at a first end receiving one of the blade holders therein, a clamping coupling at a second end for holding the blade, and a cylinder intermediate said ends, said cylinder having an elongated trapezoidal depression therein, a portion of said cylinder is rotatably received into said downward facing round connecting opening to thereby enable relative rotation about a longitudinal axis of the link between the link and the arm;

said blade is coupled with the clamping coupling of each link and with the blade holders;

a positioning device is provided at each end of the arm to control the rotational movement of a respective link, each said device includes a case having a plurality of pairs of elongated channels therein, a round connecting slot and a projecting tab extending from said case into said round connecting slot, said case is received into the adjusting hole with one of said pairs of channels receiving the respective projections, said projecting tab being received into said trapezoidal depression and said cylinder being received into the connecting slot, wherein the relative rotation between the links and the arm can be adjusted by choosing a different pair of channels to receive the projections, thus changing the longitudinal position of said projecting tab within said trapezoidal depression.

2. A windshield wiper assembly according to claim 1 wherein each link slidably receives each blade holder therein.

* * * * *